(12) United States Patent
Doerr

(10) Patent No.: US 12,393,091 B2
(45) Date of Patent: Aug. 19, 2025

(54) TRANSVERSE-MAGNETIC POLARIZATION SILICON-PHOTONIC MODULATOR

(71) Applicant: Aloe Semiconductor Inc., Irvine, CA (US)

(72) Inventor: Christopher R. Doerr, Irvine, CA (US)

(73) Assignee: Aloe Semiconductor Inc., Middletown, NJ (US)

(*) Notice: Subject to any disclaimer, the term of this patent is extended or adjusted under 35 U.S.C. 154(b) by 0 days.

(21) Appl. No.: 18/667,145

(22) Filed: May 17, 2024

(65) Prior Publication Data

US 2025/0123534 A1   Apr. 17, 2025

Related U.S. Application Data

(63) Continuation of application No. 17/529,321, filed on Nov. 18, 2021, now Pat. No. 12,001,118.

(51) Int. Cl.
| | |
|---|---|
| *G02F 1/225* | (2006.01) |
| *G02B 6/12* | (2006.01) |
| *G02B 6/122* | (2006.01) |
| *G02F 1/21* | (2006.01) |

(52) U.S. Cl.
CPC .......... *G02F 1/2257* (2013.01); *G02B 6/122* (2013.01); *G02F 1/212* (2021.01); *G02B 2006/12061* (2013.01); *G02B 2006/12097* (2013.01); *G02B 2006/12142* (2013.01)

(58) Field of Classification Search
CPC ........ G02F 1/2257; G02F 1/212; G02F 1/025; G02B 6/122; G02B 2006/12061; G02B 2006/12097; G02B 2006/12142
See application file for complete search history.

(56) References Cited

U.S. PATENT DOCUMENTS

| | | |
|---|---|---|
| 9,235,068 B2 | 1/2016 | Manouvrier |
| 9,529,150 B2 | 12/2016 | Orcutt et al. |
| 9,625,746 B2 | 4/2017 | Chen et al. |
| 10,554,014 B1 | 2/2020 | Doerr et al. |
| 10,996,539 B2 | 5/2021 | Takahashi et al. |
| 11,543,728 B2 | 1/2023 | Doerr |

(Continued)

OTHER PUBLICATIONS

Doerr et al., "Silicon Photonics in Optical Coherent Systems," Proceedings of the IEEE, Dec. 2018, 106(12):2291-2301.

(Continued)

*Primary Examiner* — John Bedtelyon
(74) *Attorney, Agent, or Firm* — Fish & Richardson P.C.

(57) ABSTRACT

A silicon-photonic optical modulator includes at least one optical input and at least one optical waveguide that is connected to the at least one optical input. The at least one optical waveguide is configured to propagate quasi-transverse-magnetic (quasi-TM) polarized light, where each of the at least one optical waveguide is configured as a rib waveguide that includes a rib arranged on a slab. The silicon-photonic optical modulator also includes at least one electrode configured to apply at least one electric field to the quasi-TM polarized light in the at least one optical waveguide. In some implementations, a height of the rib waveguide is greater than $0.85\ \lambda/n$, where $\lambda$ is a free-space wavelength of light and n is a refractive index of silicon in the silicon-photonic optical modulator, and a width of the rib waveguide is greater than a thickness of the slab.

20 Claims, 10 Drawing Sheets

(56) References Cited

U.S. PATENT DOCUMENTS

| | | |
|---|---|---|
| 11,586,059 B2 * | 2/2023 | Simard .................. G02F 1/025 |
| 11,940,709 B2 | 3/2024 | Doerr |
| 12,001,118 B2 | 6/2024 | Doerr |
| 2014/0086595 A1 | 3/2014 | Yamazaki |
| 2022/0326586 A1 | 10/2022 | Doerr |
| 2023/0145767 A1 | 5/2023 | Doerr |
| 2023/0152662 A1 | 5/2023 | Doerr |

OTHER PUBLICATIONS

Liow et al., "Silicon modulators and germanium photodetectors on SOI: monolithic integration, compatibility, and performance optimization," IEEE Journal of Selected Topics in Quantum Electronics, Nov. 2009, 16(1):307-315.

Notice of Allowance in U.S. Appl. No. 17/226,730, dated Aug. 31, 2022, 12 pages.

Webster et al., "An efficient MOS-capacitor based silicon modulator and CMOS drivers for optical transmitters," 11th International Conference on Group IV Photonics (GFP), Paris, Aug. 2014, 2 pages.

Witzens, "High-Speed Silicon Photonics Modulators," in Proceedings of the IEEE, Dec. 2018, 106(12):2158-2182.

\* cited by examiner

TRANSVERSE-MAGNETIC POLARIZATION SILICON-PHOTONIC MODULATOR

CROSS-REFERENCE TO RELATED APPLICATIONS

This application is a continuation of U.S. application Ser. No. 17/529,321, filed Nov. 18, 2021, which is incorporated by reference herein in its entirety.

TECHNICAL FIELD

The present disclosure generally relates to electro-optical modulators in silicon photonics.

BACKGROUND

In optical communication systems, electro-optical modulators provide a fundamental mechanism of modulating optical waveforms to carry information. In general, electro-optical modulators operate by modifying one or more properties of optical waveforms according to information, such as digital data, provided by electrical signals.

SUMMARY

Implementations of the present disclosure are generally directed to electro-optical modulators in silicon photonics.

One general aspect includes a silicon-photonic optical modulator including: at least one optical input and at least one optical waveguide that is connected to the at least one optical input. The at least one optical waveguide is configured to propagate quasi-transverse-magnetic (quasi-TM) polarized light, where each of the at least one optical waveguide is configured as a rib waveguide that includes a rib arranged on a slab. The silicon-photonic optical modulator also includes at least one electrode configured to apply at least one electric field to the quasi-TM polarized light in the at least one optical waveguide.

Implementations may include one or more of the following features. The silicon-photonic optical modulator where the silicon-photonic optical modulator is configured as a silicon-photonic depletion modulator in which the at least one optical waveguide includes at least one semiconductor junction diode. The silicon-photonic optical modulator where the at least one electrode is configured to apply the at least one electric field to the quasi-TM polarized light in the at least one semiconductor junction diode. The silicon-photonic optical modulator where an effective refractive index of a TM polarization 2-dimensional (2D) guided mode in the rib waveguide is greater than an effective refractive index of a transverse-electric (TE) polarization 1-dimensional (1-D) guided mode in the slab. The silicon-photonic optical modulator where a doping concentration is increased by more than $10^{17}$ activated dopants per $cm^3$ in a first portion of the slab that is within 100 nm of a nearest sidewall of the rib, as compared to a second portion of the slab that is farther than 100 nm from the nearest sidewall of the rib. The silicon-photonic optical modulator where the doping concentration is increased by a value within a range of $5\times10^{17}$ to $1\times10^{19}$ activated dopants per $cm^3$ in the first portion of the slab that is within a range of 50 nm to 500 nm of the nearest sidewall of the rib, as compared to the second portion of the slab that is farther away from the nearest sidewall of the rib. The silicon-photonic optical modulator, further including a Mach-Zehnder interferometer including the at least one optical waveguide, where the at least one optical waveguide includes: (i) a first optical waveguide including a first semiconductor junction diode, and (ii) a second optical waveguide including a second semiconductor junction diode. The silicon-photonic optical modulator, further including a semiconductor region that connects the first semiconductor junction diode with the second semiconductor junction diode. The silicon-photonic optical modulator where a distance between the first optical waveguide and the second optical waveguide is less than 500 nm for at least a portion of a longitudinal direction of the silicon-photonic optical modulator. The silicon-photonic optical modulator where the first semiconductor junction diode includes a first p-doped region and a first n-doped region. The silicon-photonic optical modulator where the second semiconductor junction diode includes a second p-doped region and a second n-doped region. The silicon-photonic optical modulator where the first p-doped region is connected to the second p-doped region through a third p-doped region in the semiconductor region that connects the first semiconductor junction diode with the second semiconductor junction diode. The silicon-photonic optical modulator where the third p-doped region is configured without any external voltage connection that has an impedance less than 100 ohm.

Another general aspect includes a silicon-photonic optical modulator including: at least one optical input and at least one optical waveguide. The at least one optical waveguide is configured to receive light from the at least one optical input, where each of the at least one optical waveguide is configured as a rib waveguide that includes a rib arranged on a slab. The silicon-photonic optical modulator also includes at least one electrode configured to apply at least one electric field to the light in the at least one optical waveguide. The silicon-photonic optical modulator where a height of the rib waveguide is greater than 0.85 $\lambda/n$, where $\lambda$ is a free-space wavelength of light and n is a refractive index of silicon in the silicon-photonic optical modulator. The silicon-photonic optical modulator where a width of the rib waveguide is greater than a thickness of the slab.

Implementations may include one or more of the following features. The silicon-photonic optical modulator where the height of the rib waveguide is greater than the width of the rib waveguide. The silicon-photonic optical modulator where the height of the rib waveguide is within a range of 320 nm to 500 nm. The silicon-photonic optical modulator where the width of the rib waveguide is within a range of 150 nm to 270 nm. The silicon-photonic optical modulator where the thickness of the slab is within a range of 50 nm to 140 nm. The silicon-photonic optical modulator where for the free-space wavelength of the light equal to 1310 nm: the height of the rib waveguide is within a range of 330 nm to 370 nm. The silicon-photonic optical modulator where the width of the rib waveguide within a range of 200 nm to 240 nm. The silicon-photonic optical modulator where the thickness of the slab is within a range of 70 nm to 110 nm. The silicon-photonic optical modulator where the at least one optical waveguide includes a first rib waveguide and a second rib waveguide. The silicon-photonic optical modulator where a distance between the first rib waveguide and the second rib waveguide is less than 500 nm. The silicon-photonic optical modulator where a height of the first rib waveguide is greater than a height of the second rib waveguide in at least part of the silicon-photonic optical modulator. The silicon-photonic optical modulator where for a first portion of the silicon-photonic optical modulator, the height of the first rib waveguide is greater than the height of the second rib waveguide by at least 40 nm. The silicon-photonic optical modulator where for a second portion of the silicon-photonic optical modulator, the height of the second rib waveguide is greater than the height of the first rib waveguide by at least 40 nm. The silicon-photonic optical modulator where a doping concentration is increased by more than $10^{17}$ activated dopants per $cm^3$ in a first portion of the slab that is within 100 nm of a nearest sidewall of the rib, as compared to a second portion of the slab that is farther than 100 nm from the nearest sidewall of the rib.

Another general aspect includes a method of modulating quasi-transverse-magnetic (TM) polarized light, the method including: inputting an input quasi-TM polarized light into at least one optical waveguide, and applying at least one electric field to quasi-TM polarized light in the at least one optical waveguide.

Implementations may include one or more of the following features. The method further including: splitting the input quasi-TM polarized light into a first optical waveguide and a second optical waveguide. The method may also include modulating a phase difference between quasi-TM polarized light in the first optical waveguide and quasi-TM polarized light in the second optical waveguide, without applying a bias voltage through an impedance that is less than 100 ohm between the first optical waveguide and the second optical waveguide. The method may also include combining quasi-TM polarized light that is output from the first optical waveguide and the quasi-TM polarized light that is output from the second optical waveguide. The method where the phase difference between the quasi-TM polarized light in the first optical waveguide and the quasi-TM polarized light in the second optical waveguide is modulated while maintaining finite depletion regions in semiconductor junction diodes in each of the first optical waveguide and the second optical waveguide.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Systems and techniques are disclosed herein that provide a novel electro-optic modulator in silicon photonics which can achieve a higher bandwidth and/or a lower drive voltage as compared with conventional electro-optical modulators. This is accomplished by novel implementations which reduce the amount of light that leaks into the slab portion of the optical waveguide of the modulator. This enables a higher doping in the slab for the same optical loss, thereby enabling a higher-bandwidth modulator without an increase in the optical loss. These technical advantages are achieved by a modulator structure that enables use of transverse-magnetic (TM) polarized light in the modulator, instead of transverse-electric (TE) polarized light. In some implementations, this is enabled by a rib waveguide structure in which the waveguide height is greater than the waveguide width. This, in turn, results in TM light having a higher effective index than TE light in the rib waveguide.

Figure 1:
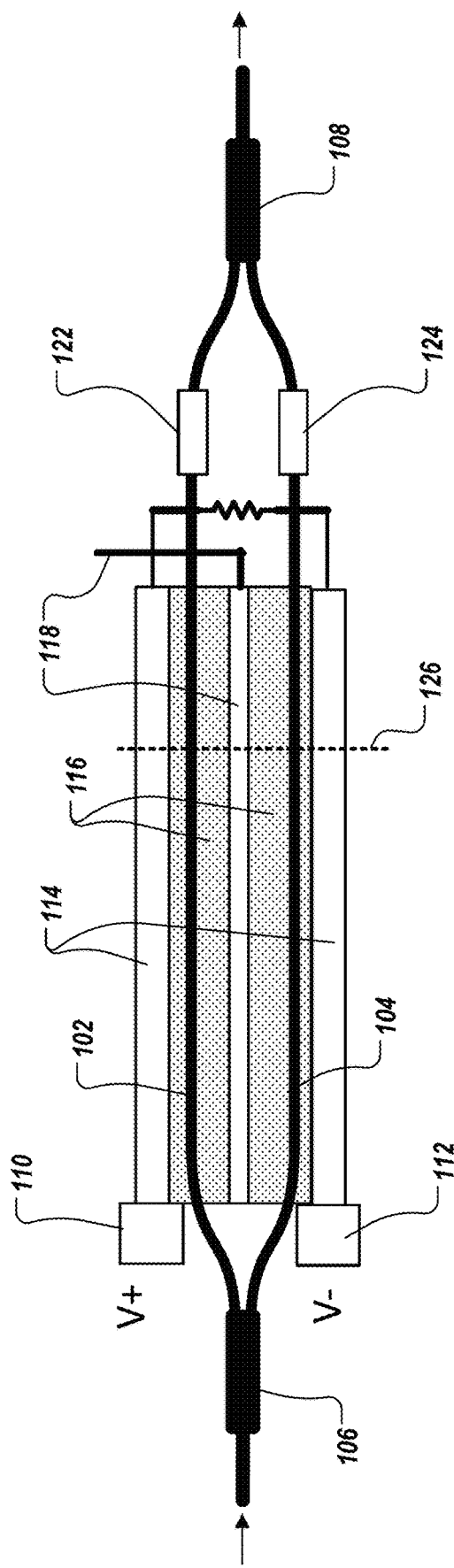
FIG. 1 illustrates an example of a top view of a modulator in which implementations of this disclosure may be utilized.

FIG. 1 illustrates an example of a top view of a differential modulator 100 in which implementations of this disclosure may be utilized. In this example, the modulator 100 is based on a Mach-Zehnder interferometer (MZI) implementation, in which optical signals propagate along the length of the modulator 100 (e.g., from left to right in FIG. 1) along two optical transmission paths 102 and 104. At the input of modulator 100, optical splitter 106 splits an input light into the two optical transmission paths 102 and 104. At the output of the modulator 100, the optical combiner 108 combines light output from the two optical transmission paths 102 and 104. The optical splitter 106 and the optical combiner 108 may be implemented in various ways, for example, using symmetric, asymmetric, or tunable optical intensity couplers. The optical transmission paths 102 and 104 can be implemented by waveguides formed in a semiconducting structure 116, as described in further detail with reference to FIG. 2, below. In some implementations, the optical cores of the waveguides, and/or the optical splitter 106, and/or the optical combiner 108 can include silicon ribs. In some implementations, an optical polarization rotator may be implemented between the input of modulator 100 and the optical transmission paths 102 and 104, which rotates a polarization of the input light so that quasi-TM light propagates in the optical transmission paths 102 and 104.

The modulator 100 uses a travelling wave configuration in which voltages applied at terminals 110 and 112 create an electrical signal that propagates along a radio frequency (RF) transmission line 114, which is terminated at an RF termination resistance. The electrical signal in RF transmission line 114 travels at the same speed as and induces electro-optic modulation in the light that propagates along the two optical transmission paths 102 and 104. In particular, the RF transmission line 114 is connected to the semiconducting structure 116 via electrodes (described in further detail with reference to FIG. 2, below), that apply respective voltages, and resulting electric fields, across one or both of the optical transmission paths 102 and 104. The applied voltage(s) induce a phase shift in the light that propagates in one or both of the optical transmission paths 102 and 104. In some implementations, the phase shift is differential in that the phase shift magnitude is equal and the phase shift sign is opposite between the optical transmission paths 102 and 104.

Electro-optic modulation is achieved by varying the voltage at one or both of the terminals 110 and 112 to modulate the differential phase shift between the phase of light in the first optical transmission path 102 and the phase of light in the second optical transmission path 104. For example, if the terminal voltages are controlled such that the differential phase shift causes destructive interference at the optical combiner 108, then this corresponds to an "off" or logic "0" state of the modulator 100. By contrast, if the terminal voltages are controlled such that the differential phase shift between the two optical transmission paths 102 and 104 causes constructive interference at the optical combiner 108, then this corresponds to the "on" or logic "1" state of the modulator 100.

The differential phase shift between the two optical transmission paths 102 and 104 can also be influenced by other factors. For example, the physical lengths of the optical transmission paths 102 and 104 can be the same to provide zero inherent differential phase shift, or can be different lengths to provide non-zero inherent differential phase shift. Furthermore, in some implementations, direct current (DC) phase shifters 122 and 124 (e.g., thermo-optic phase-shifters, such as optical waveguide heaters), may be implemented near the ends of the optical transmission paths 102 and 104 to control the relative phases of the two light signals before being combining in the optical combiner 108.

In some implementations, the phase modulation can be performed by a "push-pull" mechanism, in which the phases of light in both of optical transmission paths 102 and 104 are modulated, to control the relative phase shift between the two paths. In push-pull operation, the voltage V+ at terminal 110 is increased and voltage V− at terminal 112 is decreased (or vice versa), resulting in corresponding phase shifts of light in each of the optical transmission paths 102 and 104. Push-pull modulation can provide various advantages over non-push-pull modulation, such as achieving smaller average energy consumption and reduced chirp in the modulated signal.

In some scenarios, a direct current (DC) bias connection 118 can be connected between the two optical transmission paths 102 and 104. The DC bias connection 118 is implemented such that semiconductor junction diodes in each of the optical transmission paths 102 and 104 remain reverse biased, even when data signals applied at the terminals 110 and 112 vary between logical 1 and logical 0. Further details are provided with reference to FIG. 2, below.

Figure 2:
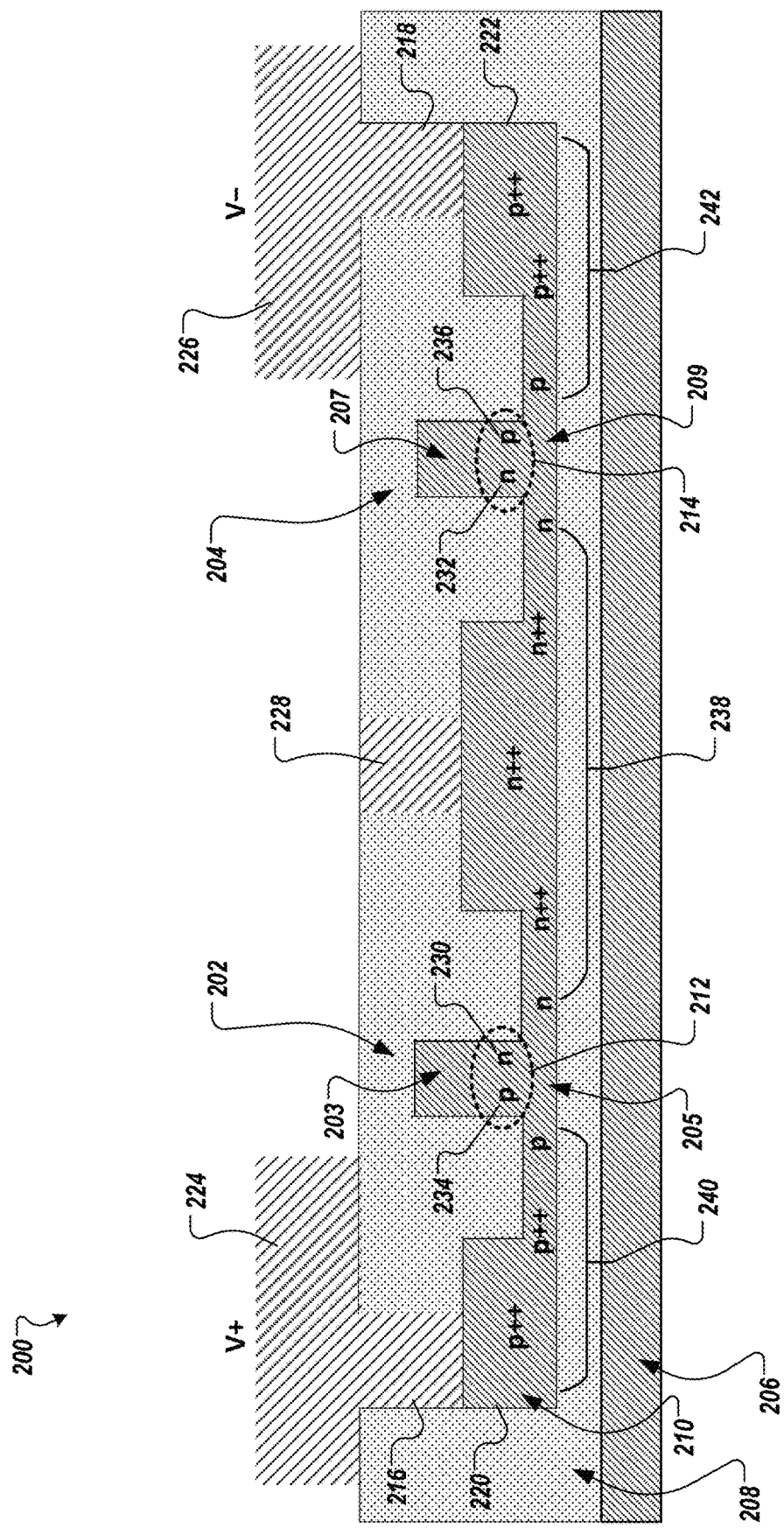
FIG. 2 illustrates an example of a cross section of a modulator according to implementations of this disclosure.

FIG. 2 illustrates an example of a cross section of a modulator 200 (e.g., cross section 126 of the modulator 100 of FIG. 1).

The cross-section of modulator 200 shows details of the MZI structure. The MZI includes a first optical waveguide 202 and a second optical waveguide 204. In some implementations, the modulator 200 includes a substrate 206 (e.g., a silicon substrate) an insulating structure 208 (e.g., a dielectric, such as an oxide), and a semiconducting structure 210 (e.g., a silicon layer which includes optical waveguides 202 and 204).

The optical waveguides 202 and 204 can be implemented, for example, as silicon ribbed waveguides on top of a slab. In the example of FIG. 2, optical waveguide 202 includes a rib 203 which is arranged on top of a slab 205. Similarly, optical waveguide 204 includes a rib 207 on top of a slab 209. The ribs 203, 207 and the slabs 205, 209 are all parts of the semiconducting structure 210. Further details of the ribbed waveguide structure are discussed with reference to FIGS. 4A and 4B, below.

Each of the optical waveguides 202 and 204 includes a semiconductor junction. The semiconductor junction diodes can be implemented, for example, by a PIN (P-type/intrinsic/N-type) junction diode or a P/N junction diode. In modulator 200, a P/N junction is implanted into each of the optical waveguides 202 and 204, forming a diode in each waveguide. These diodes are shown as first semiconductor junction diode 212 and second semiconductor junction diode 214.

The modulator 200 also includes electrodes 216 and 218 (e.g., metal electrodes) which are in physical contact with the silicon layer 210. In some implementations, the electrodes 216 and 218 are in physical contact with P-doped contact regions 220 and 222 of the silicon layer 210. The electrodes 216 and 218 may be formed, for example, by etching the insulator layer 208 and forming metal (e.g., tungsten, copper, and/or aluminum) contacts. In some implementations, the P-doped regions may instead be N-doped regions, and vice-versa, in modulator 200 (e.g., so that contact regions 220 and 222 are N-doped instead P-doped).

The modulator 200 may also include metal layers 224 and 226 on top of the electrodes 216 and 218. In some implementations, the metal layers 224 and 226 may form segments of an RF transmission line (e.g., RF transmission line 114 in FIG. 1).

In some scenarios, a DC bias connection 228 is implemented between the two optical waveguides 202 and 204. The DC bias connection 228 ensures that the semiconductor junction diodes 212 and 214 remain reverse biased during modulation. For example, in a push-pull mode of modulation, a differential voltage (e.g., V+ and V−) is applied at the metal layers 224 and 226 (and hence at electrodes 216 and 218). If the voltage (e.g., V+) at first electrode 216 is increased while the voltage (e.g., V−) at the second electrode 218 is decreased, then a width of the depletion region in the first optical waveguide 202 decreases while a width of the depletion region in the second optical waveguide 204 increases (and vice versa). As the depletion widths change, this changes the effective refractive index experienced by the light traveling along each of the optical waveguides 202 and 204, resulting in corresponding phase shifts of the light. As a result, push-pull modulation can be achieved in the modulator 200.

In the example of modulator 200, the DC bias connection 228 is applied at the cathodes 230 and 232 (N-doped regions) of the semiconductor junction diodes 212 and 214, while the varying voltages V+ and V− are applied at the anodes 234 and 236 (P-doped regions) of the semiconductor junction diodes 212 and 214. The DC bias connection 228 ensures that the semiconductor junction diodes 212 and 214 remain reverse biased. For example, in the example of modulator 200, if the bias voltage applied at the DC bias connection 228 is very low (or non-existent), then this may result in activation of the first semiconductor junction diode 212 (e.g., forward bias above approximately 0.6 V for silicon) with a significant number of carriers injected into the depletion region of the first semiconductor junction diode 212, resulting in forward bias and slower operation. Implementing the DC bias connection 228 with a sufficiently large bias voltage ensures that the semiconductor junction diodes 212 and 214 remain reverse biased under modulation.

Figure 3:
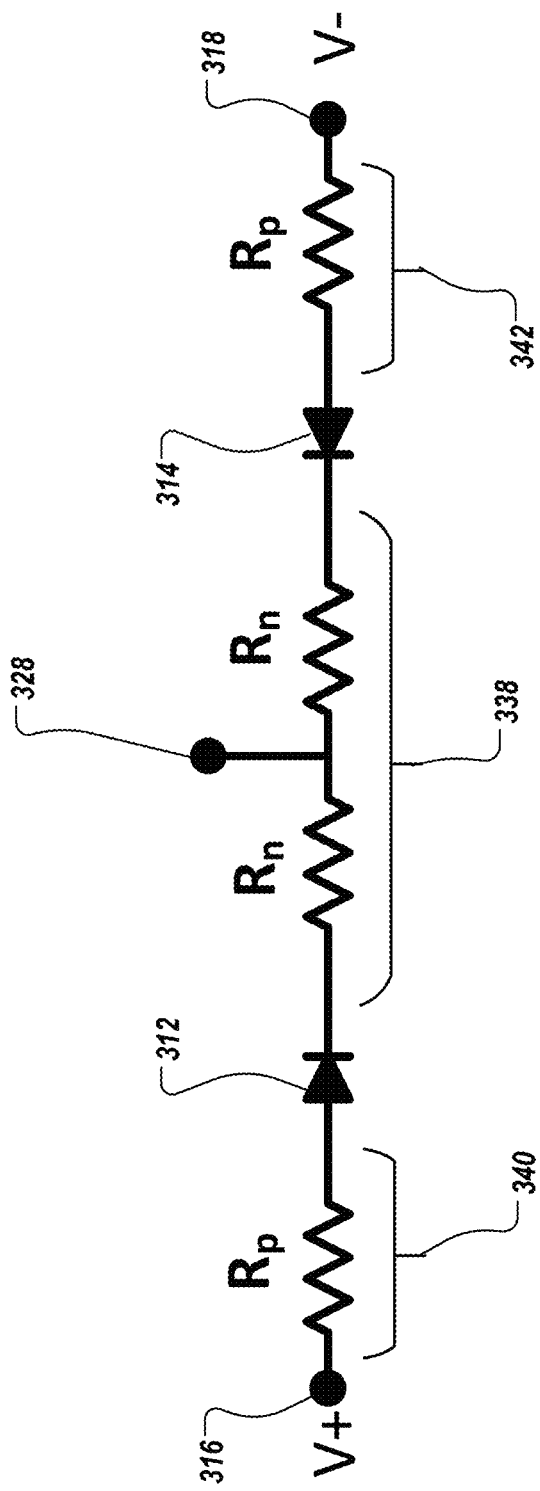
FIG. 3 illustrates an example of an equivalent circuit along a cross-section of a modulator according to implementations of this disclosure.

FIG. 3 illustrates an example equivalent circuit 300 along a cross-section of a modulator (e.g., the cross section 126 of the modulator 100 of FIG. 1).

In the example of FIG. 3, the electrical series resistance 340 between first electrode 316 and first semiconductor junction diode 312 (e.g., corresponding to semiconducting region 240 in FIG. 2) is denoted $R_p$ (e.g., in units of mΩ-m). The electrical series resistance 342 between second electrode 318 and second semiconductor junction diode 314 (e.g., corresponding to semiconducting region 242 in FIG. 2) is also denoted $R_p$ (although the actual values of electrical series resistances 340 and 342 may be different, in some implementations). The electrical series resistance 338 between semiconductor junction diodes 312 and 314 (e.g., corresponding to semiconducting region 238 in FIG. 2) is $2*R_n$ (with $R_n$ series resistance between each of semiconductor junction diodes 312 and 314 and DC bias voltage connection 328).

In the equivalent circuit for the phase modulator shown in FIG. 3, the resistances $R_n$ and $R_p$ originate primarily from the slab and is the main limitation of the modulator bandwidth. Increasing the doping in the slab reduces the resistance, thus increasing the bandwidth, but it also increases the optical loss, because doped silicon is absorptive.

Figure 4A:
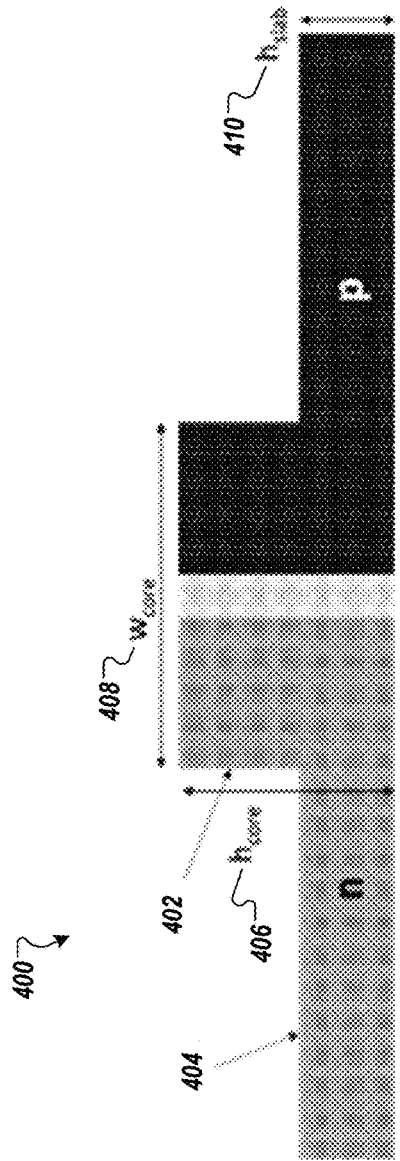
FIGS. 4A and 4B illustrate examples of a detailed cross section of a single waveguide of a modulator according to implementations of this disclosure.
Figure 4B:
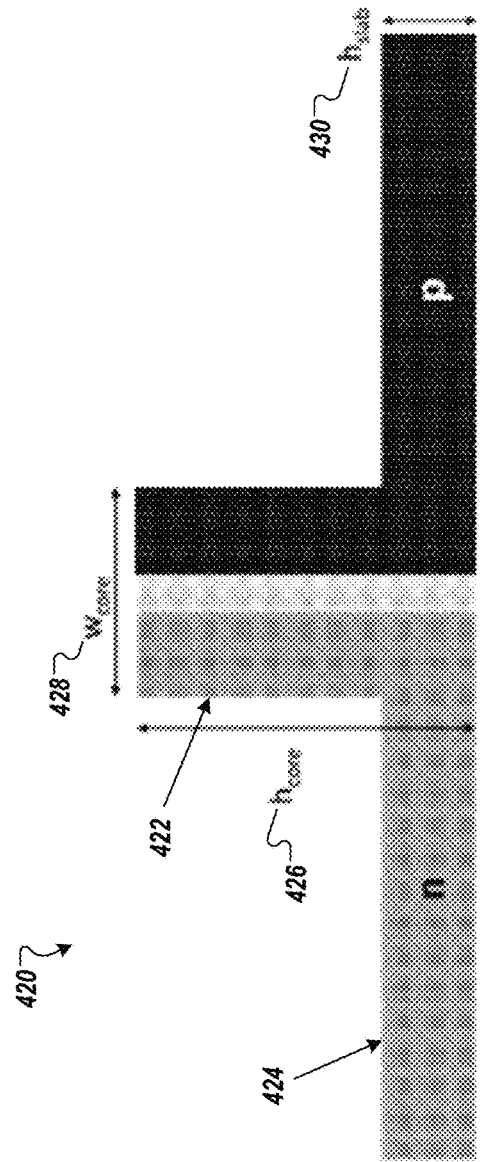

FIGS. 4A and 4B illustrate examples of a detailed cross section of a single waveguide of a silicon-photonic depletion phase modulator (e.g., a waveguide in one of transmission paths 102 or 104 of modulator 100, or one of waveguides 202 or 204 in FIG. 2). In particular, FIG. 4A illustrates an example waveguide 400 configured for TE-polarized light, which may be implemented in some systems, and FIG. 4B illustrates an example waveguide 420 which is configured for TM-polarized light, according to implementations of the present disclosure.

In both FIGS. 4A and 4B, waveguide 400 (and waveguide 420) is implemented by a rib waveguide structure, with a rib 402 (rib 422) on top of a slab 404 (slab 424). Light is guided along the rib 402 (rib 422) and propagates in a longitudinal direction of the modulator (normal to the cross section shown in FIGS. 4A and 4B) by total internal reflection inside the rib 402 (rib 422). The rib structure allows for a confined optical mode in the rib 402 (rib 422) while enabling electrical connections to the rib 402 (rib 422) through the regions on both sides of the slab 404 (slab 424). As discussed with reference to FIG. 2, above, phase modulation of light in the rib 402 (rib 422) is achieved by modulating the voltage difference between the n-doped and p-doped regions of the waveguide 400 (waveguide 420). For example, increasing the voltage difference between the n-doped and p-doped regions widens the depletion width, thereby increasing the effective refractive index of the optical mode, and allowing for phase modulation of the light in the rib 402 (rib 422).

The waveguides 400 and 420 in FIGS. 4A and 4B differ in several aspects. Most noticeably, the waveguides 400 and 420 differ in dimension, with waveguide 400 (configured for TE-polarized light) being wider and shorter, and waveguide 420 (configured for TM-polarized light) being narrower and taller. The narrower and taller configuration of waveguide 420 in FIG. 4B enables a reduction in the portion of the optical mode that is in the slab 424, allowing for a higher doping in the slab 424 for the same optical loss, as compared to waveguide 400 of FIG. 4A. The higher doping in the slab 424, in turn, allows for a higher bandwidth in modulator 420, as compared with modulator 400, without having to increase the optical loss. This is done by using transverse-magnetic (TM) polarized light in the modulator 420 instead of transverse-electric (TE) polarized light. In practical implementations, the guided optical mode in modulators 400 and 420 is actually a quasi-TE or quasi-TM mode, because guided 2D modes are almost never purely TE or TM modes. In quasi-TM mode, the dominant polarization component of the light is aligned along the y-axis. In quasi-TE mode, the dominant polarization component of the light is aligned along the x-axis. For the sake of brevity in exposition, the word "quasi" may be omitted when discussing the polarization of a guided optical mode in this disclosure.

FIG. 4A illustrates a cross section of an example waveguide 400 configured for TE-polarized light. The modulator 400 has a rib 402 on top of a slab 404. The rib has a height 406 (denoted $h_{core}$) and a width 408 (denoted $w_{core}$). As shown, in typical implementations of waveguide 400 configured to TE-polarized light, the rib height 406 ($h_{core}$) is smaller than the rib width 408 ($w_{core}$). This ensures that the effective index of the TE 2D waveguide mode in the rib 402 is higher than the effective index of the TM 1D slab mode, thus ensuring that a guided TE mode will suffer less leakage to the slab 404, as compared to a guided TM mode.

There are various reasons for why silicon-photonic modulators, such as modulator 400, are configured for TE-polarized light.

First, for modulators that employ rib waveguides, the TM 2-D rib mode index is typically significantly lower than the TE 1-D slab mode index. The rib waveguides need special conditions to guide transverse-magnetic (TM) light which are not normally met. This condition is that the effective index of the TM 2-D rib mode must be larger than that of the TE 1-D slab mode. Slab mode means refers to the 1-D mode that would be guided if there is was no rib 402, and if the slab 404 was infinitely wide. Otherwise, the TM rib mode will be phase matched to the TE slab mode propagating at certain angles with respect to the rib 402. In such a case, small perturbations will cause the light in the TM mode to leak away into the slab 404.

Second, TE-polarized light has a tighter vertical confinement in the rib 402, as compared to TM-polarized light, which mitigates losses due to the substrate below and layers on top. For example, in some implementations, there are metal routing layers above the silicon, and the metal layers can be significantly closer to the silicon before causing significant optical losses for TE-polarized light than TM-polarized light.

Third, in most silicon photonic modulators, the waveguide height 406 is less than the waveguide width 408, which results in TE-polarized light having a higher effective index than TM-polarized light. This allows for a smaller bend radius, decreasing the size of the silicon photonic devices.

Fourth, most silicon-photonic modulators employ TE-polarized light because most of the other elements in a silicon photonic circuit are designed for TE polarization. For example, most grating couplers are configured for TE polarization.

Fifth, in many scenarios, it is typically easier to fabricate a waveguide structure that has a width greater than its height, e.g., because the lithography process is simplified by a shallower depth of etching.

However, TM polarized light has distinct advantages. For example, TM-polarized light has the advantage of having less light in the slab 424, as compared to TE-polarized light. To understand why TM-polarized light has less light in the slab 424 than TE-polarized light, one can consider the boundary conditions on the electric field of light that are given by Maxwell's equations. In non-magnetic materials, such as silicon, the transverse electric field, $E_∥$, is continuous across a boundary; whereas the normal electric field times the permittivity, ($E_⊥$) (ε), is continuous across a boundary. Because the permittivity of silicon is approximately 5.8 times than that of oxide, when the electric field is normal to a thin piece of silicon surrounded by oxide, the electric field inside that silicon is approximately 5.8 times lower than in the surrounding oxide. Thus, TM-polarized light has very little electric field inside the silicon slab 424.

Figure 5B:
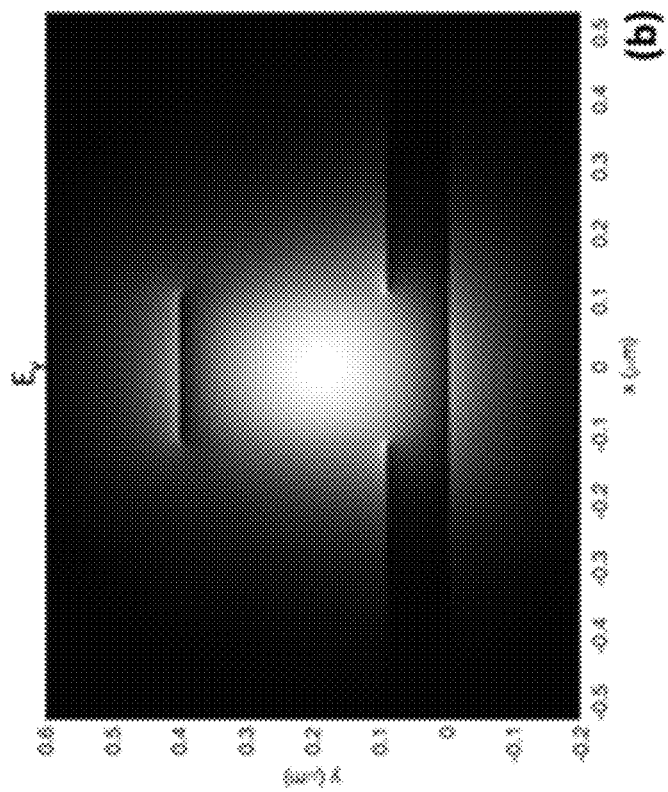
FIGS. 5A and 5B illustrate examples of TE and TM modes in silicon rib waveguides, respectively.
Figure 5A:
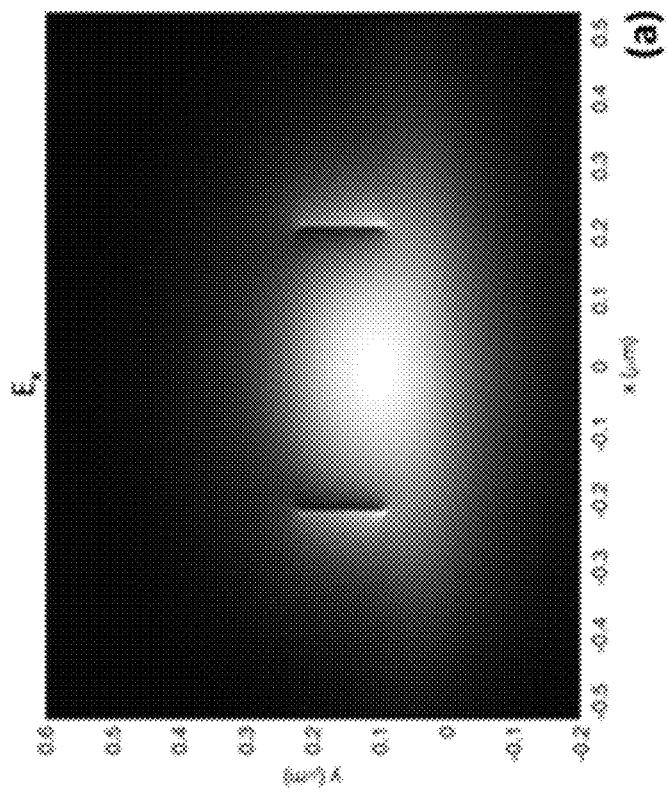

This can be seen visually in FIGS. 5A and 5B, which show TE and TM modes in silicon rib waveguides, respectively. FIG. 5A shows an example of calculated modes of a conventional silicon phase modulator using TE-polarized light. In particular, FIG. 5A shows the magnitudes of the x-component of the electric field. FIG. 5B shows an example of calculated modes of a silicon phase modulator using TM-polarized light, according to implementations of the present disclosure. In particular, FIG. 5B shows the magnitudes of the y-component of the electric field.

As shown, there is significant light in the slab in FIG. 5A but very little light in the slab in FIG. 5B. Thus the slab in FIG. 5B can have significantly higher doping near the rib and thus significantly lower series resistance.

In addition, the waveguide rib dimensions are different in the examples of FIGS. 5A and 5B. In both cases, the slab thickness is 90 nm. However, in FIG. 5A, the waveguide rib height and rib width are 220 nm and 420 nm, respectively, whereas in FIG. 5B the waveguide rib height and rib width are 400 nm and 220 nm, respectively. The waveguide of FIG. 5A is a typical modulator waveguide configured for TE-polarized light. As discussed above, in such a configuration, a guided TM mode will leak into the slab, because the effective index of the TM 2D rib mode is lower than the effective index of the TE 1D slab mode (see Table 1, below).

By contrast, the waveguide of FIG. 5B is able to guide a TM mode without leakage into the slab, because the waveguide rib is taller and narrower. Having a taller waveguide rib increases the effective index of the TM 2D waveguide mode above that of the TE 1D slab mode, as seen in Table 1. This occurs when the waveguide rib height is greater than a threshold of approximately $0.85 \lambda/n$, and when the waveguide rib width is wider than the slab height, where $\lambda$ is the free-space wavelength of light and n is the refractive index of silicon. This guarantees that for TM-polarized light, the electric field has fallen to a low value at the top and bottom of the waveguide so that the boundary condition does not cause significant field to fall outside the waveguide. For instance, for a wavelength of $\lambda=1310$ nm, the threshold is $0.85 \lambda/n=320$ nm. Thus, in this example, the waveguide rib height should be larger than 320 nm and the waveguide rib width should be larger than 90 nm.

TABLE 1

Effective mode indices, for a wavelength of $\lambda$ = 1310 nm.

| | Waveguide configured for TE-polarized light (420 × 220 nm²) | Waveguide configured for TM-polarized light (220 × 400 nm²) |
|---|---|---|
| TE 1D slab (90 nm) | 2.25 | |
| TE 2D waveguide | 2.70 | 2.47 |
| TM 2D waveguide | 2.13 | 2.58 |

Implementations of modulators according to the present disclosure which are configured for TM-polarized light can provide various technical advantages (as compared to typical modulators configured for TE-polarized light). For example, the doping in the slab can be increased significantly and/or higher doping can be placed closer to the rib. In some implementations, a doping concentration can be increased by a value within a range of $5\times10^{17}$ to $1\times10^{19}$ (e.g., increased within a range of $1\times10^{18}$ to $1\times10^{19}$) activated dopants per cm³ in a first portion of the slab that is within a range of 50 nm to 500 nm (e.g., 100 nm) of a nearest sidewall of the rib, as compared to a second portion of the slab that is farther than 100 nm from the nearest sidewall of the rib. Some implementations of the present disclosure can provide approximately 3.5 times lower series resistance as compared to a typical modulator that is configured for TE-polarized light. Another advantage is that the phase modulation efficiency can be increased for a given voltage and a given modulator length. This is a consequence of TM-polarized light being more confined horizontally in the waveguide rib, perpendicular to the depletion region, thus resulting in a larger effective index change for a given voltage change.

In addition, modulator implementations according to the present disclosure can be configured to mitigate potential technical challenges. For example, in modulators configured for TM-polarized light, because the waveguide rib is configured to be taller and thinner (as compared with waveguide ribs of typical modulators designed for TE-polarized light), there can be increased series resistance along the vertical edges of the rib, connecting to the top of the waveguide. To mitigate such resistance, a preferred embodiment is to configure the waveguide rib to be only a small amount taller than the threshold to make the effective TM 2D rib index higher than the TE 1D slab effective index. For example, in some implementations, the waveguide rib height is 350 nm and the waveguide rib width is 220 nm, with a 90-nm slab at 1310-nm wavelength.

Another challenge is that the capacitance of the p-n junction of the waveguide (e.g., semiconductor junction diodes 212 and 214 in FIG. 2) could be increased, as a consequence of the depletion region being taller. However, the fringing fields contribute significantly to the capacitance in these structures, and consequently the capacitance increase is sublinear to the height increase. As such, increasing the waveguide rib height by a factor of 2 results in an increase of the capacitance by only a factor of approximately 1.5.

FIGS. 6-9 relate to modulators according to other implementations of the present disclosure. In contrast with the modulators of FIGS. 1-3, the modulators of FIGS. 6-9 do not implement any bias voltage connection between the waveguides, resulting in significantly smaller series resistance between electrodes, and thus even higher bandwidth of modulation. Furthermore, in FIGS. 6-9, the modulators implement waveguide structures that vary in height so as to mitigate detrimental optical coupling between the closely-spaced waveguides.

The features described with reference to FIGS. 6-9 can help improve upon the structure of the modulators in FIGS. 1-3 in various aspects. For example, the presence of DC bias connection 228 in FIG. 2 increases the physical distance of the semiconducting (e.g., silicon) region 238 between the semiconductor junction diodes 212 and 214. This results in significant electrical series resistance in the semiconducting region 238 that connects the semiconductor junction diodes 212 and 214. Typical techniques to reduce such electrical series resistance, such as increasing the silicon doping of the semiconducting structure, can have negative consequences such as increasing optical absorption.

Furthermore, the semiconducting regions 240 and 242 in FIG. 2 (which connect each of semiconductor junction diodes 212 and 214 with their respective electrodes 216 and 218) are P-doped semiconducting material, which has higher resistance than N-doped semiconducting material (for the same optical absorption). This results in significant electrical series resistance in the semiconducting regions 240 and 242 between electrodes 216 and 218 and the semiconductor junction diodes 212 and 214.

Consequently, the total electrical series resistance between electrodes 216 and 218 in FIG. 2 can significantly attenuate the voltage along the modulator 200 due to charging and discharging of the diode capacitance. Furthermore, this attenuation typically increases as modulation frequency increases. The resulting RF loss along the modulator 200 can detrimentally impact the bandwidth of the modulator 200.

Figure 6:
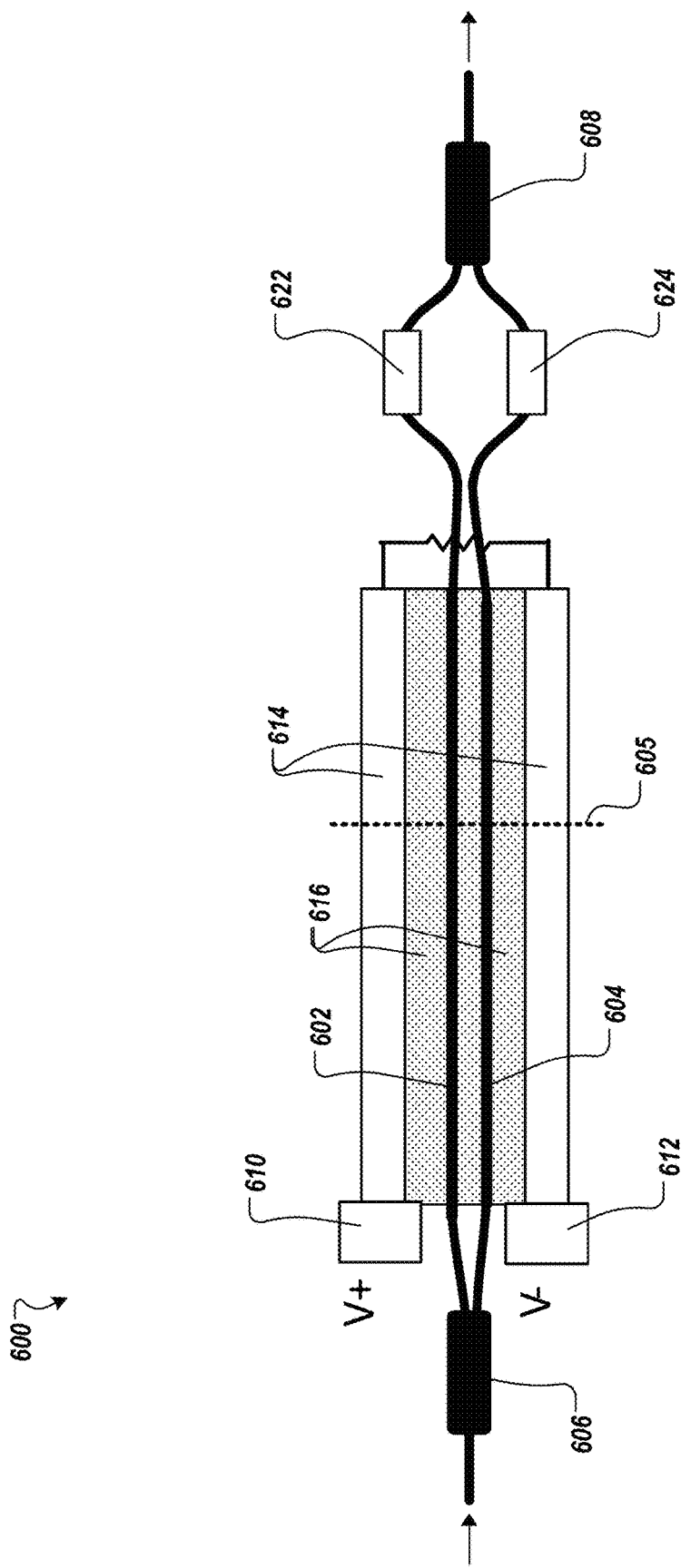
FIG. 6 illustrates an example of a top view of a modulator, according to implementations of the present disclosure.

FIG. 6 illustrates an example of a top view of a modulator 600 according to implementations of the present disclosure.

The modulator 600 is based on an MZI implementation which includes two optical transmission paths 602 and 604, optical splitter 606, and optical combiner 608. The modulator 600 further includes terminals, such as terminal 610 and terminal 612, through which voltages can be applied. The voltages travel along RF transmission line 614, which is connected to semiconducting structure 616 via electrodes that apply respective voltages, and resulting electric fields, across one or both of the optical transmission paths 602 and 604. In some implementations, an optical polarization rotator may be implemented between the input of modulator 600 and the optical transmission paths 602 and 604, which rotates a polarization of the input light so that quasi-TM light propagates in the optical transmission paths 602 and 604.

In contrast to the modulator 100 of FIG. 1, the modulator 600 does not implement any DC bias connection between the two optical transmission paths 602 and 604. This enables the two optical transmission paths 602 and 604 to be more closely-spaced together, thus reducing electrical series resistance therebetween. For example, in some implementations, the distance between the waveguides of the two optical transmission paths 602 and 604 is less than 0.5 µm for at least a portion of the longitudinal direction of the optical transmission paths 602 and 604. In some implementations, the distance between the waveguides is less than 2.0 µm for at least a portion of the longitudinal direction of the optical transmission paths 602 and 604. In some implementations, the distance between the waveguides is within a range of 0.1 µm to 2.0 µm for at least a portion of the longitudinal direction of the optical transmission paths 602 and 604. In some implementations, the distance between the waveguides is defined as the distance between the inner sidewalls of the two waveguides, at a given point along a longitudinal direction of the modulator 600 (e.g., at a point 605 in FIG. 6).

However, because the two optical transmission paths 602 and 604 are more closely spaced, there is risk of more significant detrimental optical coupling between light in optical transmission path 602 and light in optical transmission path 604. To mitigate such optical coupling, in some implementations, the waveguide of one of the optical transmission paths (602 or 604) is designed to have a greater height than the other path, at the same distance along the length of the modulator 600. This helps ensure that the light traveling in the waveguides of optical transmission paths 602 and 604 are not phase matched, thus mitigating optical coupling between the two waveguides. An alternative way to understand the importance of using different waveguide heights is to look at the two eigenmodes of the coupled waveguides of optical transmission paths 602 and 604. If the waveguides have equal heights, then the lowest order eigenmode is the even eigenmode, and the second lowest eigenmode is the odd eigenmode. In such a scenario, no differential modulation can occur. However, if one waveguide is sufficiently taller than the other, then the lowest order eigenmode consists of light that is predominantly in the taller waveguide, and the second lowest eigenmode is predominantly in the shorter waveguide. This enables differential modulation to occur despite the closely-spaced waveguides. For example, in some implementations, the waveguide of the one of the optical transmission paths 702 or 704 is taller by at least 40 nm than the waveguide of the other optical transmission path. In some implementations, the waveguide height difference is within a range of 40 nm to 120 nm.

Furthermore, in such implementations, the height variation of the two waveguides may be exchanged along the modulator 600, to help ensure that the total length of the taller portions in each waveguide are equal, and also that the total length of the shorter portions in each waveguide are equal. In the example of FIG. 6, moving from the left to right, the waveguide of first optical transmission path 602 is taller than the waveguide of the second optical transmission path 604, and then becomes shorter than the waveguide of the second optical transmission path 604 (alternatively, the first optical transmission path 602 may start shorter and become taller). There may be one such exchange in relative heights in the middle of modulator 600, but in some implementations, additional height exchanges can be included, e.g., as long as the distance between height exchanges is significantly longer than the beat length between the two eigenmodes in the two waveguides, which is typically 10 µm. This helps mitigate optical coupling between the two waveguides. In some implementations, an odd number of exchanges is preferred, since this will help ensure that the beginning and end transitions cancel each other out.

Although the description of FIG. 6, above, provided an example of a modulator 600 with variable-height waveguides in the two optical transmission paths 602 and 604, in other implementations, the waveguides may have constant height along the length of the modulator 600.

Furthermore, although the description of FIG. 6 provided an example of a modulator 600 without a physical DC bias connection, in some implementations, a DC bias connection may be implemented between the two optical transmission paths 602 and 604, but through a high impedance. For example, in some implementations, the high impedance is achieved with an impedance greater than 1 kohm. As another example, in some implementations, the high impedance is achieved with an impedance greater than 100 ohm. In such scenarios of a DC bias connection through a high impedance, a current would be generated by the voltage difference between (i) the external voltage and (ii) the voltage that would be between the optical transmission paths 602 and 604 if there were no applied external voltage. This generated current would be less than the diode leakage current plus any photo-generated current in the diodes, and thus the circuit would act primarily as if there were no applied external DC bias voltage (e.g., similar to a true floating voltage). Therefore, it should be appreciated that implementations of the present disclosure, such as those shown in FIGS. 6-9 in which there is no physical DC bias connection, can also be implemented with a DC bias connection but through a high impedance.

The modulator 600 implements an example of a continuous traveling-wave structure, in which the RF transmission line 614 is continuously connected to the semiconducting structure 616. Alternatively, a segmented traveling-wave structure can be implemented, as described with reference to FIG. 7, below.

Figure 7:
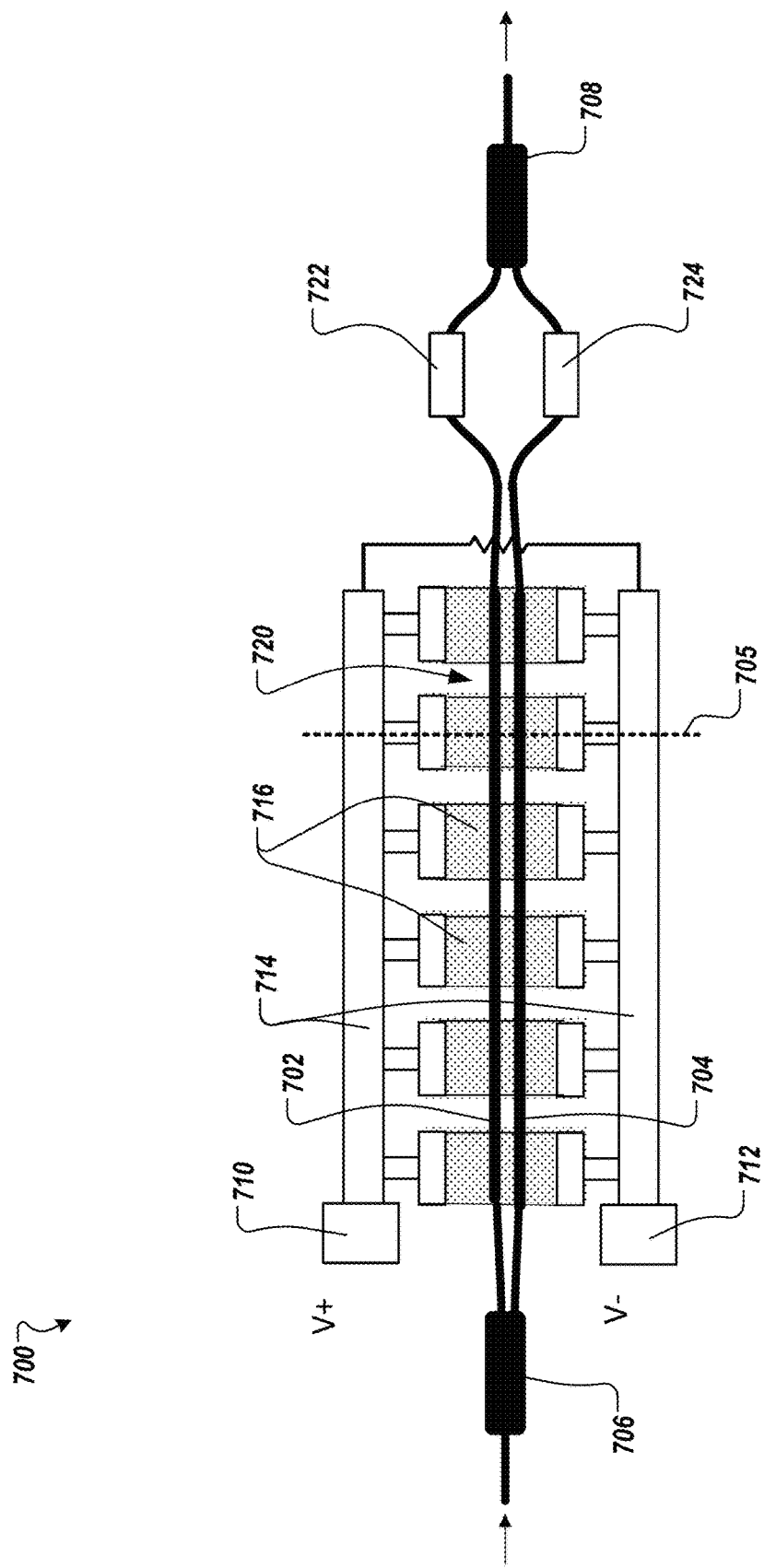
FIG. 7 illustrates another example of a top view of a modulator, according to implementations of the present disclosure.

FIG. 7 illustrates another example of a top view of a modulator 700 according to implementations of the present disclosure. The modulator 700 is an example of an implementation of a segmented traveling-wave structure.

The modulator 700 is also based on an MZI implementation which includes two optical transmission paths 702 and 704, optical splitter 706, and optical combiner 708. The modulator 700 further includes terminals, such as terminal 710 and terminal 712, through which voltages can be applied. The voltages travel along RF transmission line 714, which is connected to a semiconducting structure 716 via electrodes that apply respective voltages, and resulting electric fields, across one or both of the optical transmission paths 702 and 704. The modulator 700 also does not implement any DC bias connection between the two optical transmission paths 702 and 704, which reduces the distance therebetween. For example, in some implementations, the distance between the waveguides of the two optical transmission paths 702 and 704 is less than 0.5 µm for at least a portion of the longitudinal direction of the optical transmission paths 702 and 704. In some implementations, the distance between the waveguides is less than 2.0 µm for at least a portion of the longitudinal direction of the optical transmission paths 702 and 704. In some implementations, the distance between the waveguides is within a range of 0.1 µm to 2.0 µm for at least a portion of the longitudinal direction of the optical transmission paths 702 and 704. In some implementations, the distance between the waveguides is defined as the distance between the inner sidewalls of the two waveguides, at a given point along a longitudinal direction of the modulator 700 (e.g., at a point 705 in FIG. 7).

The differences between modulator 600 of FIG. 6 and modulator 700 of FIG. 7 arise from the configuration of the semiconducting structure (616, 716) and the manner in which the RF transmission line (614, 714) is connected to the semiconducting structure (616, 716). Modulator 600 of FIG. 6 implements a continuous traveling wave structure in which RF transmission line 614 is continuously directly connected to the semiconducting structure 616. By contrast, modulator 700 of FIG. 7 implements a segmented traveling wave structure in which RF transmission line 714 is intermittently connected to segments of the semiconducting structure 716, with intermittent regions 720 along the optical transmission paths 702 and 704 in which there is no semiconducting structure. This structure of modulator 700 can also be referred to as a capacitively loaded traveling wave structure, and has an advantage of providing an additional degree of freedom in implementing the RF transmission 714, e.g., of the average capacitance per unit length of the RF transmission line 714. A lumped-element modulator can also benefit from the techniques disclosed herein.

Furthermore, in modulator 700, the waveguides of optical transmission paths 702 and 704 have different widths in different sections of the modulator 700, similar to the configuration of the waveguides in modulator 600 of FIG. 6. Further details of the width variation of the waveguides are provided further below.

Figure 8:
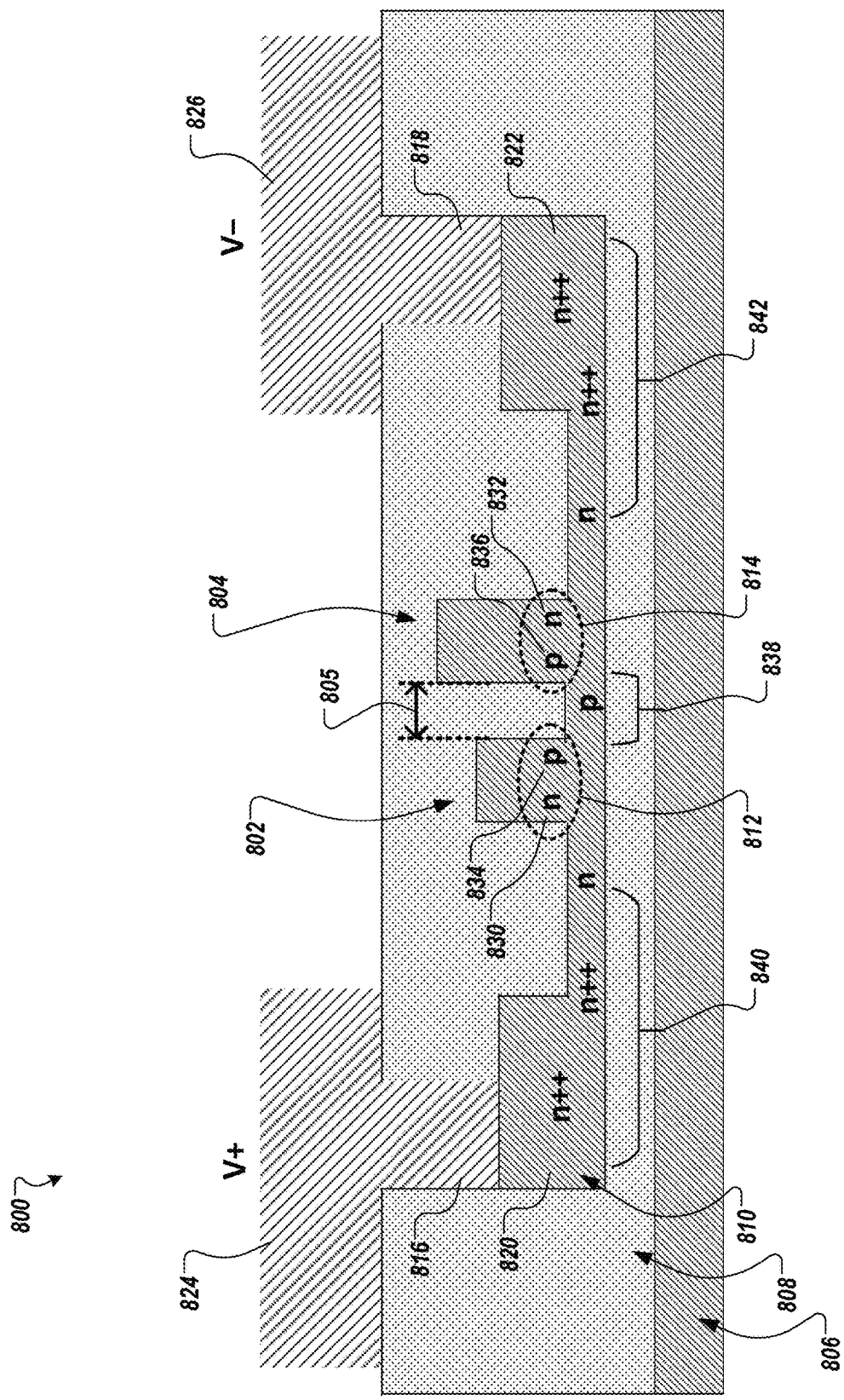
FIG. 8 illustrates an example of a cross section of a modulator, according to implementations of the present disclosure.

FIG. 8 illustrates an example of a cross section of a modulator 800 according to implementations of the present disclosure (e.g., a cross section at point 605 of modulator 600 of FIG. 6 or a cross at point 705 of modulator 700 of FIG. 7). In particular, the modulator 800 of FIG. 8 is an example of a differential, close-spaced design in which one waveguide is taller than the other.

The cross-section of modulator 800 shows details of the MZI structure. The MZI includes a first optical waveguide 802 and a second optical waveguide 804. The optical waveguides 802 and 804 can be implemented, for example, as silicon ribbed waveguides on top of a slab. In some implementations, the modulator 800 includes a substrate 806 (e.g., a silicon substrate) an insulating structure 808 (e.g., a dielectric, such as an oxide), and a semiconducting structure 810 (e.g., a silicon layer which includes optical waveguides 802 and 804).

In some implementations, as discussed in regards to FIGS. 6 and 7, above, one of the optical waveguides 802 and 804 is taller than the other optical waveguide. For example, in FIG. 8, the second optical waveguide 804 is taller by at least 40 nm than the first optical waveguide 802. In some implementations, the waveguide height difference is within a range of 40 nm to 120 nm.

Each of the optical waveguides 802 and 804 includes a semiconductor junction. The semiconductor junction diodes can be implemented, for example, by a PIN (P-type/intrinsic/N-type) junction diode or a P/N junction diode. In modulator 800, a P/N junction is implanted into each of the optical waveguides 802 and 804, forming a diode in each waveguide. These diodes are shown as first semiconductor junction diode 812 and second semiconductor junction diode 814.

The modulator 800 also includes electrodes 816 and 818 (e.g., metal electrodes) which are in physical contact with the silicon layer 810. In some implementations, the electrodes 816 and 818 are in physical contact with N-doped contact regions 820 and 822 of the silicon layer 810. The electrodes 816 and 818 may be formed, for example, by etching the insulator layer 808 and forming metal (e.g., tungsten, copper, and/or aluminum) contacts. The modulator 800 may also include metal layers 824 and 826 on top of the electrodes 816 and 818. In some implementations, the metal layers 824 and 826 may form segments of an RF transmission line (e.g., RF transmission line 114 in FIG. 1). In some implementations, the P-doped regions may instead be N-doped regions, and vice-versa, in modulator 800 (e.g., so that contact regions 820 and 822 are N-doped instead P-doped).

There are numerous differences between modulator 800 and modulator 200 of FIG. 2. Most notably, modulator 800 does not implement any DC bias voltage connection between semiconductor junction diodes 812 and 814 (as compared to modulator 200 which implements DC bias connection 228). Instead, the semiconductor junction diodes 812 and 814 are connected in series with opposite polarity (with anodes 834 and 836 connected together). This ensures that a continuous current can never flow through the semiconductor junction diodes 812 and 814. This configuration enables the voltages across the two semiconductor junction diodes 812 and 814 to naturally self-adjust to ensure that the diodes 812 and 814 remain reverse-biased, despite variations in modulation voltages (e.g., V+ and V−) that may be applied at electrodes 816 and 818. Implementing a floating voltage between the semiconductor junction diodes 812 and 814 automatically biases the diodes 812 and 814 at the most efficient point of the modulator in terms of phase shift per volt, which is where the diodes 812 and 814 are just below turn-on. In some implementations, this phase shift per volt is the "gain" of the modulator.

Another difference between modulator 800 and modulator 200 of FIG. 2 is that the polarities of semiconductor junction diodes 812 and 814 are flipped, as compared with modulator 200. In particular, semiconductor junction diodes 812 and 814 have their respective (P-doped) anodes 834 and 836 closer to the center of modulator 800, and their respective (N-doped) cathodes 830 and 832 closer to the edges of modulator 800. As such, the semiconducting region 838 between the semiconductor junction diodes 812 and 814 is P-doped, while semiconducting regions 840 and 842 (connecting each of semiconductor junction diodes 812 and 814 with their respective electrodes 816 and 818) are N-doped.

These aforementioned differences provide numerous technical advantages for modulator 800, as compared to modulator 200 of FIG. 2. One advantage is that the absence of a DC bias voltage connection in modulator 800 enables the two optical waveguides 802 and 804 to be implemented significantly closer to each other, as compared to modulator 200 of FIG. 2. This enables significant reduction in the size of semiconducting region 838 connecting semiconductor junction diodes 812 and 814, which significantly reduces the electrical series resistance between semiconductor junction diodes 812 and 814. For example, in some implementations, the distance (denoted as 805 in FIG. 8) between the two optical waveguides 802 and 804 is less than 0.5 µm. In some implementations, the distance 805 between the two optical waveguides 802 and 804 is less than 2.0 µm. In some implementations, the distance 805 between the two optical waveguides 802 and 804 is within a range of 0.1 µm to 2.0 µm. In some implementations, the distance 805 between waveguides may be defined as the distance between the inner sidewalls of the two waveguides, at a given point along the longitudinal direction of the modulator 800 (e.g., measured at a cross section of the modulator 800 as shown in FIG. 8).

Another advantage is that, since P-doped silicon has a higher resistivity than N-doped silicon (for the same optical absorption), higher-resistivity P-doped material is used in the smaller semiconducting region 838 (between semiconductor junction diodes 812 and 814), and lower-resistivity N-doped material is used in the larger semiconducting regions 840 and 842 (connecting semiconductor junction diodes 812 and 814 with electrodes 816 and 818). Alternatively, in some implementations, N-doped material can be used in the smaller semiconducting region 838, and P-doped material can be used in the larger semiconducting regions 840 and 842.

As a result, the total series resistance between the electrodes 816 and 818 is significantly reduced, thus significantly improving bandwidth and speed of the modulation.

Although the lack of a DC bias voltage connection in modulator 800 takes away a degree of freedom in the ability to adjust the amount of reverse bias in semiconductor junction diodes 812 and 814, such limitations are, in some scenarios, outweighed by the significant benefits offered by the configuration of modulator 800, such as improved bandwidth and speed of modulation.

Figure 9:
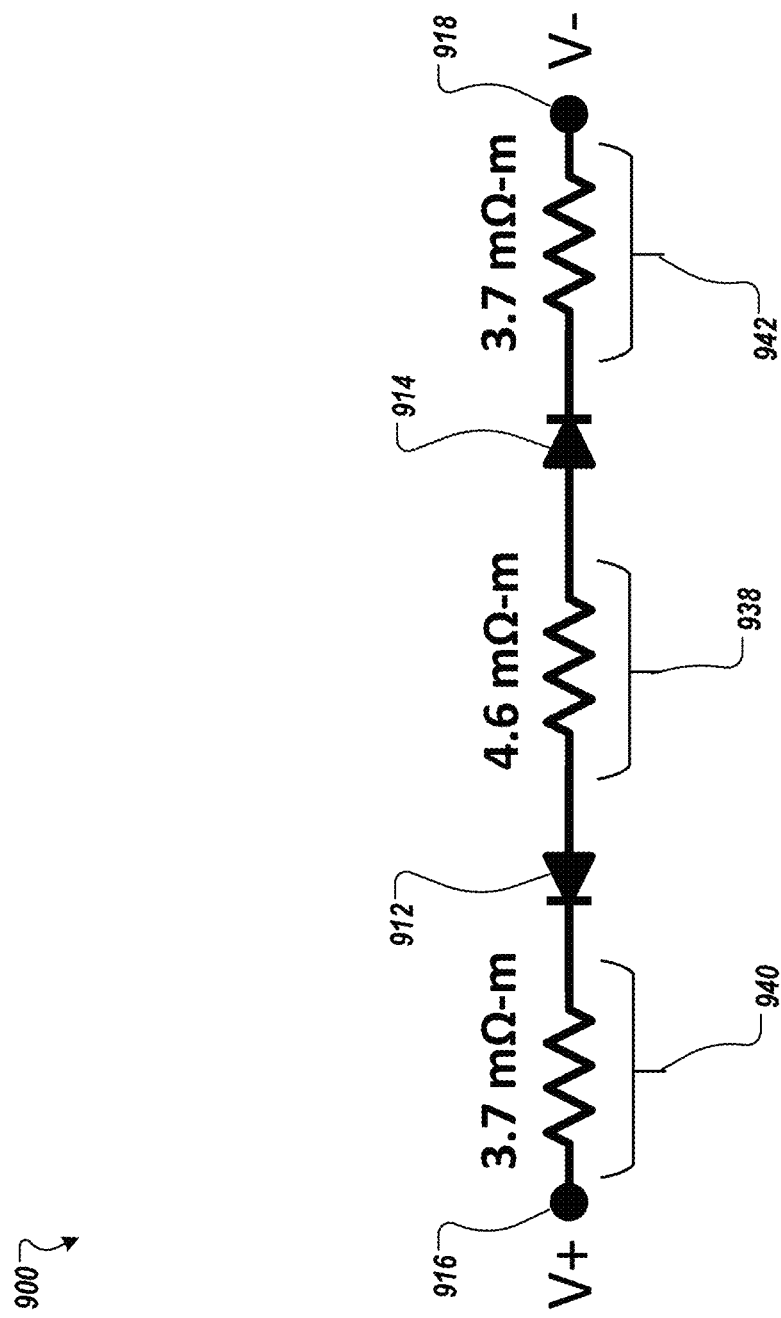
FIG. 9 illustrates an example of an equivalent circuit along a cross-section of a modulator, according to implementations of the present disclosure.

FIG. 9 illustrates an example equivalent circuit 900 along a cross-section of a modulator according to implementations of the present disclosure (e.g., the cross section of modulator 800 of FIG. 8).

In the example of FIG. 9, the electrical series resistance 940 between first electrode 916 and first semiconductor junction diode 912 (e.g., corresponding to semiconducting region 840 in FIG. 8) is 3.7 mΩ-m. The electrical series resistance 942 between second electrode 918 and second semiconductor junction diode 914 (e.g., corresponding to semiconducting region 842 in FIG. 8) is 3.7 mΩ-m. The electrical series resistance 938 between semiconductor junction diodes 912 and 914 (e.g., corresponding to semiconducting region 838 in FIG. 8) is 4.6 mΩ-m (without any DC bias voltage connection between the diodes).

As seen in this example, the total series resistance between electrodes 916 and 918 is reduced by about a factor of two, as compared with the equivalent circuit 300 of FIG. 3. This reduction in total series resistance can significantly improve modulator performance. For example, the modulation bandwidth is increased, by reducing the RF loss along the modulator. Alternatively, modulator efficiency can be improved. For example, a thinner slab can be utilized, which increases total series resistance but also increases optical confinement in the optical waveguides 802 and 804, thus improving modulator efficiency. Alternatively, a thicker waveguide can be utilized, which increases capacitance but also increases optical confinement.

The modulators according to implementations of the present disclosure can be used in many applications. For example, one application is a high-speed optical intensity modulator to generate intensity-modulated direct-detection (IM-DD) formats such as non-return-to-zero (NRZ) or pulse amplitude modulation (PAM). Another application is to use the modulator in conjunction with a second modulator with a 90-degree relative phase shift as part of a larger interferometer to generate more complex modulation formats for coherent detection, such as quadrature phase-shift keying (QPSK) modulation or quadrature amplitude modulation (QAM). For example, this can be achieved by an in-phase/quadrature (IQ) modulator structure that includes nested modulators, with each of the two branches of a modulator (the outer modulator) implementing another modulator (the inner modulators). In some implementations, phase shifters can be implemented that set 180-degree and 90-degree phase differences for the inner and outer modulators, respectively. Each modulator in such a nested modulator structure can be implemented as described in the present disclosure.

Figure 10:
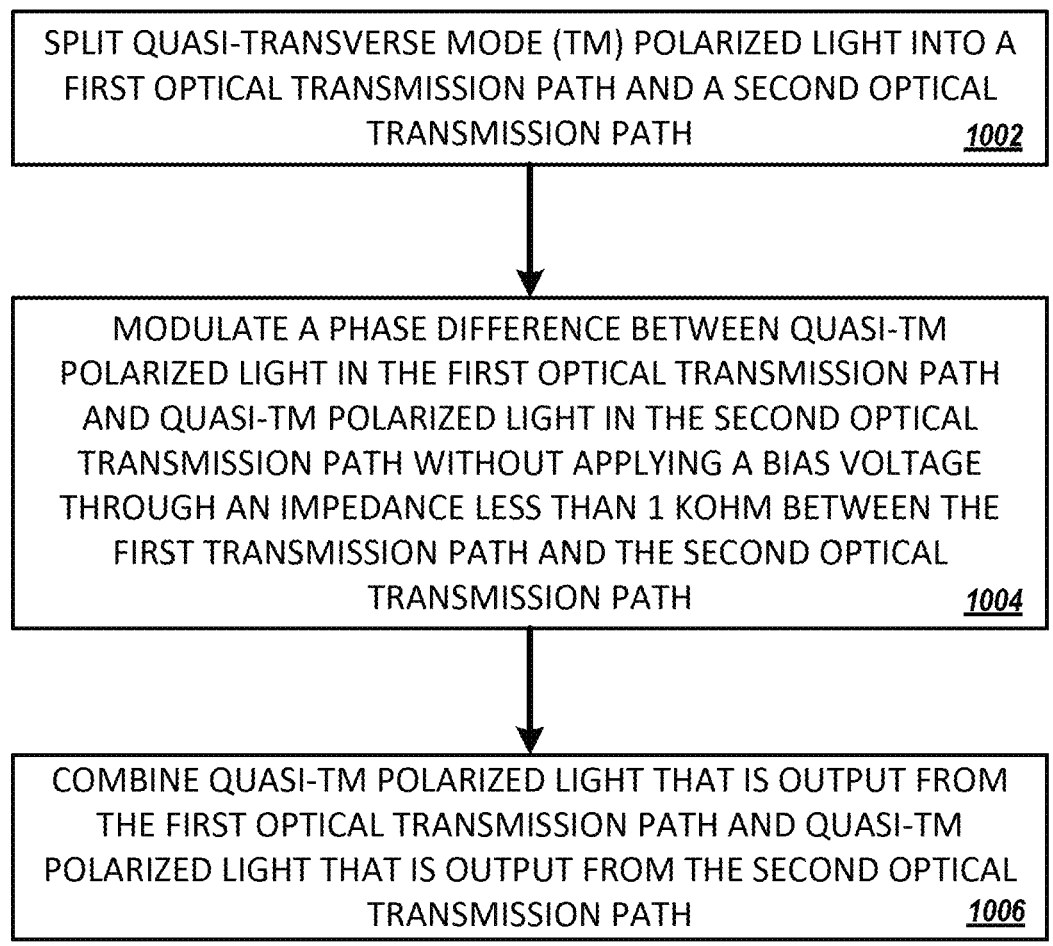
FIG. 10 is a flowchart illustrating an example of modulating a TM polarized optical signal, according to implementations of the present disclosure.

FIG. 10 is a flowchart illustrating an example method 1000 of modulating a quasi-TM polarized optical signal, according to implementations of the present disclosure. The method 1000 may be performed by using a modulator as disclosed herein.

The method 1000 includes splitting quasi-TM polarized light into a first optical transmission path and a second optical transmission path (1002). In some implementations, an optical polarization rotator may be implemented at the input of the modulator, which rotates a polarization of the input light so that quasi-TM light propagates in the optical transmission paths.

The method 1000 further includes modulating a phase difference between quasi-TM polarized light in the first optical transmission path and quasi-TM polarized light in the second optical transmission path without applying a bias voltage between the first optical transmission path and the second optical transmission path (1004). In some implementations, the phase difference between the quasi-TM polarized light in the first optical transmission path and the quasi-TM polarized light in the second optical transmission path is modulated while maintaining finite depletion regions in semiconductor junction diodes in each of the first optical transmission path and the second optical transmission path. For example, this modulation can be performed using the floating anode structure of modulators discussed above.

The method 1000 further includes combining quasi-TM polarized light that is output from the first optical transmission path and quasi-TM polarized light that is output from the second optical transmission path (1006).

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

What is claimed is:

1. A silicon-photonic optical modulator comprising:
at least one optical input;
a Mach-Zehnder interferometer comprising a first optical waveguide and a second optical waveguide that are connected to the at least one optical input and that are configured to propagate quasi-transverse-magnetic (quasi-TM) polarized light, wherein each of the first optical waveguide and the second optical waveguide is configured as a rib waveguide that comprises a rib arranged on a slab;
a polarization rotator between the at least one optical input and the first optical waveguide, the polarization rotator configured to rotate a polarization of input light from the at least one optical input to produce the quasi-TM polarized light in the first optical waveguide; and
electrodes configured to apply electric fields to the quasi-TM polarized light.

2. The silicon-photonic optical modulator of claim 1, wherein the silicon-photonic optical modulator is configured as a silicon-photonic depletion modulator in which the first optical waveguide and the second optical waveguide each comprise a semiconductor junction diode, and
wherein the electrodes are configured to apply the electric fields to the quasi-TM polarized light in the semiconductor junction diodes of the first optical waveguide and the second optical waveguide.

3. The silicon-photonic optical modulator of claim 1, wherein an effective refractive index of a TM-polarization 2-dimensional (2D) guided mode in the rib waveguide of each of the first optical waveguide and the second optical waveguide is greater than an effective refractive index of a transverse-electric (TE) polarization 1-dimensional (1-D) guided mode in the slab.

4. The silicon-photonic optical modulator of claim 1, wherein a height of the rib of each of the first optical waveguide and the second optical waveguide is greater than $0.85\ \lambda/n$, where $\lambda$ is a free-space wavelength of light and n is a refractive index of silicon in the silicon-photonic optical modulator, and
wherein a width of the rib is greater than a thickness of the slab.

5. The silicon-photonic optical modulator of claim 1, wherein a height of the rib of each of the first optical waveguide and the second optical waveguide is greater than 320 nm.

6. The silicon-photonic optical modulator of claim 1, wherein the first optical waveguide comprises a first rib waveguide comprising a first semiconductor junction diode, and the second optical waveguide comprises a second rib waveguide comprising a second semiconductor junction diode,
wherein the first semiconductor junction diode and the second semiconductor junction diode are electrically connected by a semiconductor region, and
wherein the semiconductor region is configured without any external voltage connection that has an impedance less than 100 ohm.

7. The silicon-photonic optical modulator of claim 1, comprising a segmented electrode structure comprising:
as the electrodes, a plurality of electrode segments spaced apart along a longitudinal direction of the Mach-Zehnder interferometer, the plurality of electrode segments configured to apply the electric fields to the quasi-TM polarized light; and
a plurality of intermittent regions at which the first optical waveguide and the second optical waveguide are free of applied electric fields.

8. The silicon-photonic optical modulator of claim 1, wherein a distance between the first optical waveguide and the second optical waveguide is less than 2.0 µm for at least a portion of a longitudinal direction of the Mach-Zehnder interferometer.

9. The silicon-photonic optical modulator of claim 1, wherein the first optical waveguide comprises a first semiconductor junction diode and the second optical waveguide comprises a second semiconductor junction diode, and
wherein the first semiconductor junction diode and the second semiconductor junction diode are connected in series with opposite polarity.

10. The silicon-photonic optical modulator of claim 1, wherein quasi-TM light traveling in the first optical waveguide is phase-mismatched with quasi-TM light traveling in the second optical waveguide.

11. The silicon-photonic optical modulator of claim 1, wherein the first optical waveguide comprises a first rib extending from the slab and the second optical waveguide comprises a second rib extending from the slab,
wherein a height of the first rib is greater than a height of the second rib.

12. The silicon-photonic optical modulator of claim 11, wherein the height of the first rib is greater than the height of the second rib by a difference in a range from 40 nm to 120 nm.

13. The silicon-photonic optical modulator of claim 11, wherein the height of the first rib is greater than the height of the second rib at a same first distance along the first optical waveguide and the second optical waveguide, and
wherein a second height of the second rib is greater than a second height of the first rib at a same second distance along the first optical waveguide and the second optical waveguide.

14. The silicon-photonic optical modulator of claim 11, wherein the first optical waveguide and the second optical waveguide exchange, an odd number of times, which of the first rib or the second rib is taller along lengths of the first optical waveguide and the second optical waveguide.

15. A silicon-photonic optical modulator comprising:
at least one optical input;
a Mach-Zehnder interferometer comprising a first rib waveguide and a second rib waveguide that are connected to the at least one optical input, wherein the first rib waveguide comprises a first rib extending from a slab, wherein the second rib waveguide comprises a second rib extending from the slab, and wherein the first rib waveguide and the second rib waveguide are configured to propagate quasi-transverse-magnetic (quasi-TM) polarized light;
a polarization rotator between the at least one optical input and the first rib waveguide, the polarization rotator configured to rotate a polarization of input light from the at least one optical input to produce the quasi-TM polarized light in the first rib waveguide; and
electrodes configured to apply electric fields to light in at least one of the first rib waveguide or the second rib waveguide,
wherein the first rib waveguide comprises a first semiconductor junction diode and the second rib waveguide comprises a second semiconductor junction diode,
wherein a height of the first rib waveguide and a height of the second rib waveguide are greater than 0.85 $\lambda/n$, where $\lambda$ is a free-space wavelength of light and n is a refractive index of silicon in the silicon-photonic optical modulator.

16. The silicon-photonic optical modulator of claim 15, wherein a width of the first rib is greater than a thickness of the slab.

17. The silicon-photonic optical modulator of claim 15, wherein the height of the first rib waveguide is in a range from 320 nm to 500 nm, and wherein a thickness of the slab is in a range from 50 nm to 140 nm.

18. The silicon-photonic optical modulator of claim 17, wherein the height of the first rib waveguide is in a range from 330 nm to 370 nm, and wherein the thickness of the slab is in a range from 70 nm to 110 nm.

19. The silicon-photonic optical modulator of claim 15, comprising a segmented electrode structure comprising:
as the electrodes, a plurality of electrode segments spaced apart along a longitudinal direction of the Mach-Zehnder interferometer, the plurality of electrode segments configured to apply the electric fields to the quasi-TM polarized light; and
a plurality of intermittent regions at which the first rib waveguide and the second rib waveguide are free of applied electric fields.

20. The silicon-photonic optical modulator of claim 15, wherein a height of the first rib is greater than a height of the second rib.

* * * * *